United States Patent [19]

Horn et al.

[11] Patent Number: 5,226,158

[45] Date of Patent: Jul. 6, 1993

[54] METHOD AND APPARATUS FOR MAINTAINING REFERENTIAL INTEGRITY WITHIN A RELATIONAL DATABASE

[75] Inventors: Gary R. Horn, Austin; Timothy R. Malkemus, Round Rock, both of Tex.

[73] Assignee: International Business Machines Corporation, Armonk, N.Y.

[21] Appl. No.: 356,141

[22] Filed: May 24, 1989

[51] Int. Cl.$^5$ .............................................. G06F 15/40
[52] U.S. Cl. ............................. 395/600; 364/DIG. 1; 364/222.81; 364/222.82; 364/282.1; 364/283.4
[58] Field of Search ................. 364/200, 900; 395/600, 395/425

[56] References Cited

U.S. PATENT DOCUMENTS

| | | | |
|---|---|---|---|
| 4,833,597 | 5/1989 | Wakayama et al. | 364/200 |
| 4,918,593 | 4/1990 | Huber | 395/600 |
| 4,933,848 | 6/1990 | Haderle et al. | 395/600 |
| 4,947,320 | 8/1990 | Crus et al. | 364/200 |

OTHER PUBLICATIONS

C. J. Date, "An Introduction to Database Systems," vol. I, 1986, pp. 249-255.
C. J. Date, "An Introduction to Database Systems," vol. II, 1983.

Primary Examiner—Paul V. Kulik
Attorney, Agent, or Firm—Andrew J. Dillon

[57] ABSTRACT

A method and apparatus are disclosed for maintaining the referential integrity of a relational database by determining the validity of each new referential constraint which is brought about by the proposed creation or alteration of a data table within the database. All relationships of a newly created or altered data table are first examined for known non-error conditions in which the new referential constraint will not affect other data tables. Next, self-referencing relationships are examined to detect known error situations. Thereafter, a model is created of a selected portion of the database which includes the newly created or altered data table; all data tables dependent from the newly created or altered data table; all data tables descendant from those dependent tables which are delete-connected to the newly created or altered data table; all data tables which are the parent tables for any data table previously included; and, any ancestor data table having a Cascade delete rule relationship with a parent table previously included. The validity of the new referential constraint is then verified by examining only that portion of the database represented by the model to determine if the proposed relationship allows referential integrity to be maintained.

3 Claims, 10 Drawing Sheets

DEPARTMENTS

| DEPT NO | NAME | DEPT HEAD |
|---|---|---|
| 0001 | CORPORATE | SMITH |
| 0002 | FINANCIAL | JONES |
| 0003 | LEGAL | JOHNSON |
| ⋮ | ⋮ | ⋮ |
| 000N | R & D | NEWTON |

DIVISIONS

| DIV NO | NAME | DIV HEAD | DEPT NO |
|---|---|---|---|
| 1003 | LEGAL-TAX | FOSTER | 0003 |
| 2003 | LEGAL-PATENT | SHARP | 0003 |
| ⋮ | ⋮ | ⋮ | ⋮ |

EMPLOYEES

| NAME | EE NO | DIV NO | DEPT NO | MANAGER | MANAGER EE NO |
|---|---|---|---|---|---|
| ABEL | 61248 | 2003 | 0003 | SHARP | 42178 |
| BAKER | 74321 | 2003 | 0003 | SHARP | 42178 |
| ⋮ | ⋮ | ⋮ | ⋮ | ⋮ | ⋮ |
| SHARP | 42178 | 2003 | 0003 | JOHNSON | 39614 |

*Fig. 2*

METHOD AND APPARATUS FOR MAINTAINING REFERENTIAL INTEGRITY WITHIN A RELATIONAL DATABASE

BACKGROUND OF THE INVENTION

1. Technical Field

The present invention relates in general to improvements in data processing systems and in particular to improvements in relational databases within a data processing system. Still more particularly, the present invention relates to methods for maintaining referential integrity within a relational database despite the creation or alteration of a data table within that database.

2. Background Art

One clear advantage in the utilization of data processing systems is the systematic manipulation and utilization of large quantities of data. Typically, these large quantities are arranged in an orderly manner in a so-called database which may be rapidly accessed either directly or indirectly by any processor within the data processing system.

More recently, the utilization of database management systems has reached a new level of sophistication with the advent of the relational database. A relational database is a database composed of multiple data tables. The relational model which forms the basis for such a database includes three major subsections. A structural subsection which addresses the structure a relational database must conform to, a data manipulation subsection which governs the manner in which data must be manipulated within a relational database and a referential integrity subsection which controls the manner in which changes in one area of the database affect the remainder of the database.

Referential integrity may be achieved by adhering to selected constraints which, while difficult to implement, are well known in the literature. For example, the major referential constraint is the assertion that non-null values of a designated "foreign key" are valid only if they also appear as values of the "primary key" of a designated data table. In the terminology of relational databases, the "parent" data table is the data table in a relationship of two data tables which contains the designated primary key. Similarly, the "dependent" data table is the data table in the aforementioned relationship which contains the foreign key.

It should be clear upon reflection that a single data table may be both a parent table and a dependent table in an arbitrary number of relationships. A data table may be said to be a "descendant" of a parent data table if it is a dependent of that data table or a descendant of a dependent of the parent data table. Conversely, a data table is said to be an "ancestor" of a second data table if it is a parent of that table or a parent of a table which includes the second table as a descendant. Also, a data table may be a descendant and an ancestor of itself if it is interconnected in a so-called "cycle" with multiple other data tables. A data table may also be both a parent data table and a dependent data table for a single constraint in a so-called "self-referencing" table.

In order to control the referential integrity of a relational database it is necessary to associate a relationship rule with each referential constraint. The three activities which must be addressed in such relationships are the results of an update, an insertion or a deletion operation. In view of the relational nature of the data tables in such a database it should be obvious that any one of these three activities in one data table may have an effect on another data table within the database. Thus, a series of rules is generally associated with each such activity.

The rule governing insertions is quite simple. A primary key may be inserted; however, a foreign key may only be inserted if it meets the basic referential constraint. That is, a non-null value of a foreign key may only be inserted if it also appears as a value of the primary key. Similarly, updates to a foreign key are only possible if the new foreign key also appears as a valid primary key. In the depicted embodiment of the present method, updates to a primary key are "Restricted," that is, they are only permitted where that primary key does not have any dependants. Of course, a system could be implemented such that updates to a primary key will automatically be implemented in each dependent key in a so-called "Cascade" mode of operation, or will cause each dependent key to be "Set Null."

The delete operation in the depicted embodiment of the present invention will utilize all three of the aforementioned relationship rules. Therefore, it is possible to have a delete rule of "Restrict," "Cascade" or "Set Null." In this manner, the effect of a deletion anywhere in the database is clearly defined in terms of its effect on dependent data tables. In the terminology of relational databases, any data table which is involved in a delete operation with a second data table is said to be "delete connected" to the second data table.

Two additional restrictions are generally applied to the relationships among a set of data tables with respect to delete connections. Firstly, a table may not be delete connected to itself in a cycle of two or more tables. Secondly, if a data table is delete connected to another data table through multiple paths, the relationship rules governing the delete operations must be identical and must not be Set Null.

Thus, any attempted modification to the structure of a relational database must carefully traverse each of these relationship rules to maintain referential integrity. The large numbers of related data tables contained within a relational database and the multiple relationships which may exist between those tables make the verification of the relationships after an attempted modification to the structure of the database quite difficult. It should therefore be obvious that a need exists for a method which may be utilized to efficiently and rapidly ascertain whether or not an attempted modification to the structure of a relational database will allow consistent referential integrity.

SUMMARY OF THE INVENTION

It is therefore one object of the present invention to provide an improved relational database.

It is another object of the present invention to provide an improved relational database which permits referential integrity to be maintained after modifications to the relationships thereof.

It is yet another object of the present invention to provide an improved relational database which permits referential integrity to be maintained after modifications to the relationships thereof and which permits those relationships to be verified without the necessity of reviewing the entire database structure.

The foregoing objects are achieved as is now described. The method and apparatus of the present invention may be utilized to maintain the referential integrity of a relational database by determining the validity of each new referential constraint which is brought about by the proposed creation or alteration of a data table within the database. All relationships of a newly created or altered data table are first examined for known non-error conditions in which the new referential constraint will not affect other data tables. Next, self-referencing relationships are examined to detect known error situations. Thereafter, a model is created of a selected portion of the database which includes the newly created or altered data table; all data tables dependent from the newly created or altered data table; all data tables descendant from those dependent tables which are delete-connected to the newly created or altered table; all data tables which are the parent tables for any data table previously included; and, any ancestor data table having a Cascade delete rule relationship with a parent table previously included. The validity of the new referential constraint is then verified by examining only that portion of the database represented by the model to determine if the proposed relationship allows referential integrity to be enforced.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a pictorial representation of multiple data tables which may be utilized to illustrate the interrelation of such data tables;

DETAILED DESCRIPTION OF THE PREFERRED EMBODIMENT

Figure 1:
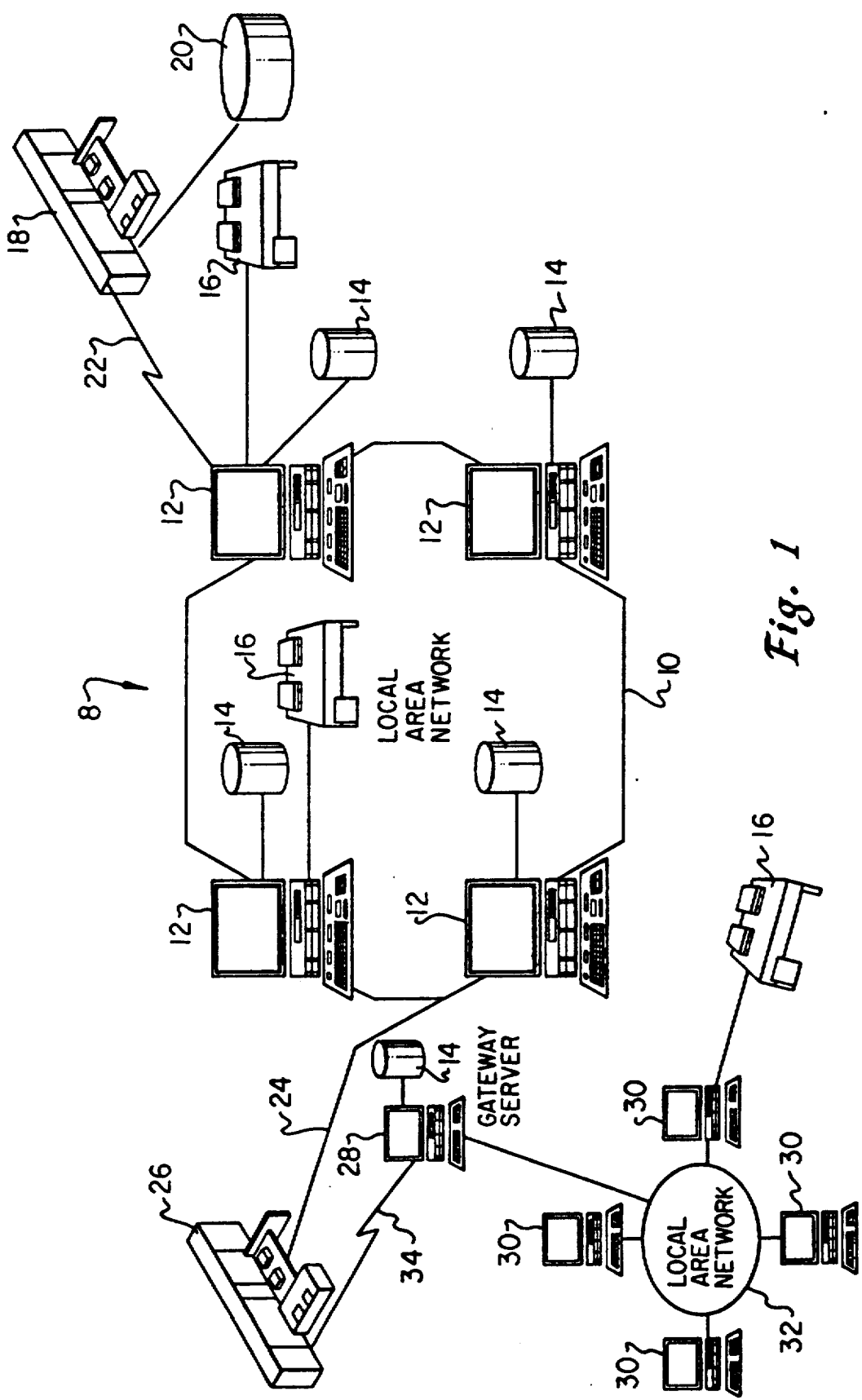
FIG. 1 is a pictorial representation of a data processing network which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the multiple data tables which make up a relational database. In accordance with the method of the present invention, proposed modifications to that database will be examined to determine if referential integrity will be maintained.

Still referring to FIG. 1, it may be been that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

Referring now to FIG. 2, there is depicted a pictorial representation of multiple data tables which may be utilized to illustrate the interrelation of such data tables. As may be seen, data table 40 is illustrated pictorially and includes information concerning the departments of a fictitious organization. The information within data table 40 is arranged in three separate columns which include: the department number; the namely of the department; and the department head. These columns are labeled 42, 44, and 46, respectively.

Similarly, data table 48 illustrates a data table directed to the divisions within the fictitious organization. As above, this data table is divided into four columns which include: the division number; the name of the division, the division head; and the department number under which that division falls. These columns are numbered 50, 52, 54, and 56.

Finally, data table 58 is the employee data table for this fictitious organization and it is divided into six columns which include: the name of the employee; the employee number; the division number; the department number; the manager for that employee; and the manager's employee number. These columns are numbered 60, 62, 64, 66 68, and 70, respectively.

The interrelation of these various data tables may be illustrated with regard to one or more of the columns which are depicted therein. For example, in a relationship between department data table 40 and division table 48, department number may be considered a primary data key within department data table 40. Similarly, department number appears in division data table 48 as a foreign key. As stated above, referential integrity requires that no non-null values for department number may be listed within column 56 of division data table 48 unless that value also appears as a primary key within column 42 of department data table 40. In this manner, the referential integrity of the two related data tables may be maintained.

Similarly, employee data table 58 includes several keys which relate back to either department data tale 40 or division data table 48. For example, division number, as illustrated in column 64 of employee data table 58 is a foreign key within employee data table 58 and a primary key within division data table 48. In addition, department number listed within column 66 of employee data table 58 is a foreign key which must also be located within column 42 of department data table 40 in order for referential integrity to be maintained.

A further aspect of related data tables may be illustrated with respect to employee data table 58. That is, employee number, as listed in column 62, is a primary key of employee data table 58. Manager employee number, as illustrated in column 70 of employee data table 58 is therefore a foreign key and in order for a manager employee number to be valid it must also appear within column 62, the primary employee number data key in employee data table 58. This type of relationship is referred to as self-referencing.

Thus, upon reference to FIG. 2, those ordinarily skilled in the art will appreciate that multiple data tables may be related in a relational database and that there are many different relationships which may exist between these multiple data tables.

Figure 3A:
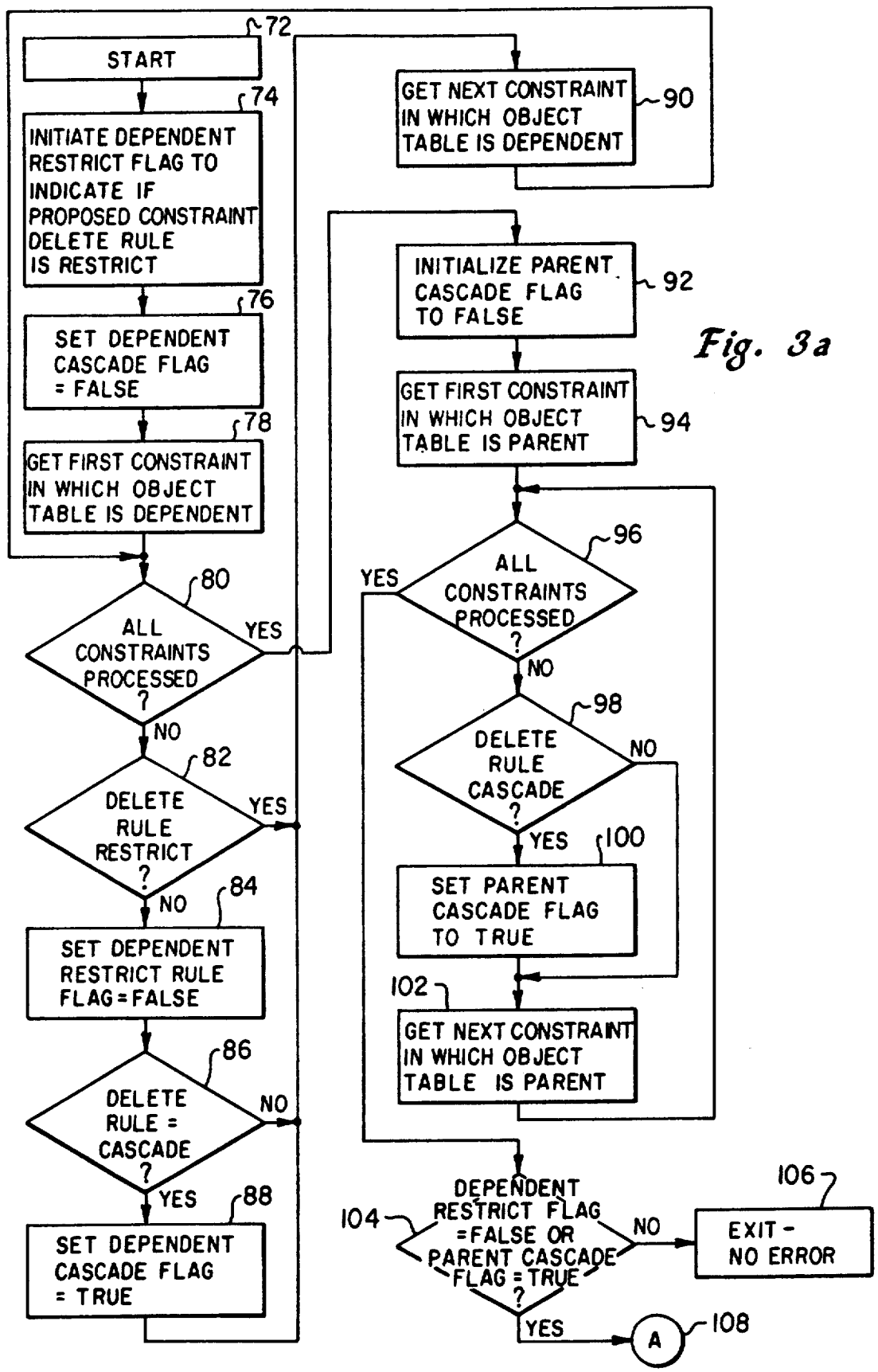
FIGS. 3A, 3B, and 3C depict a logic flow chart illustrating the method of the present invention which may be utilized to verify referential integrity may be maintained after the addition of a proposed new referential constraint.
Figure 3B:
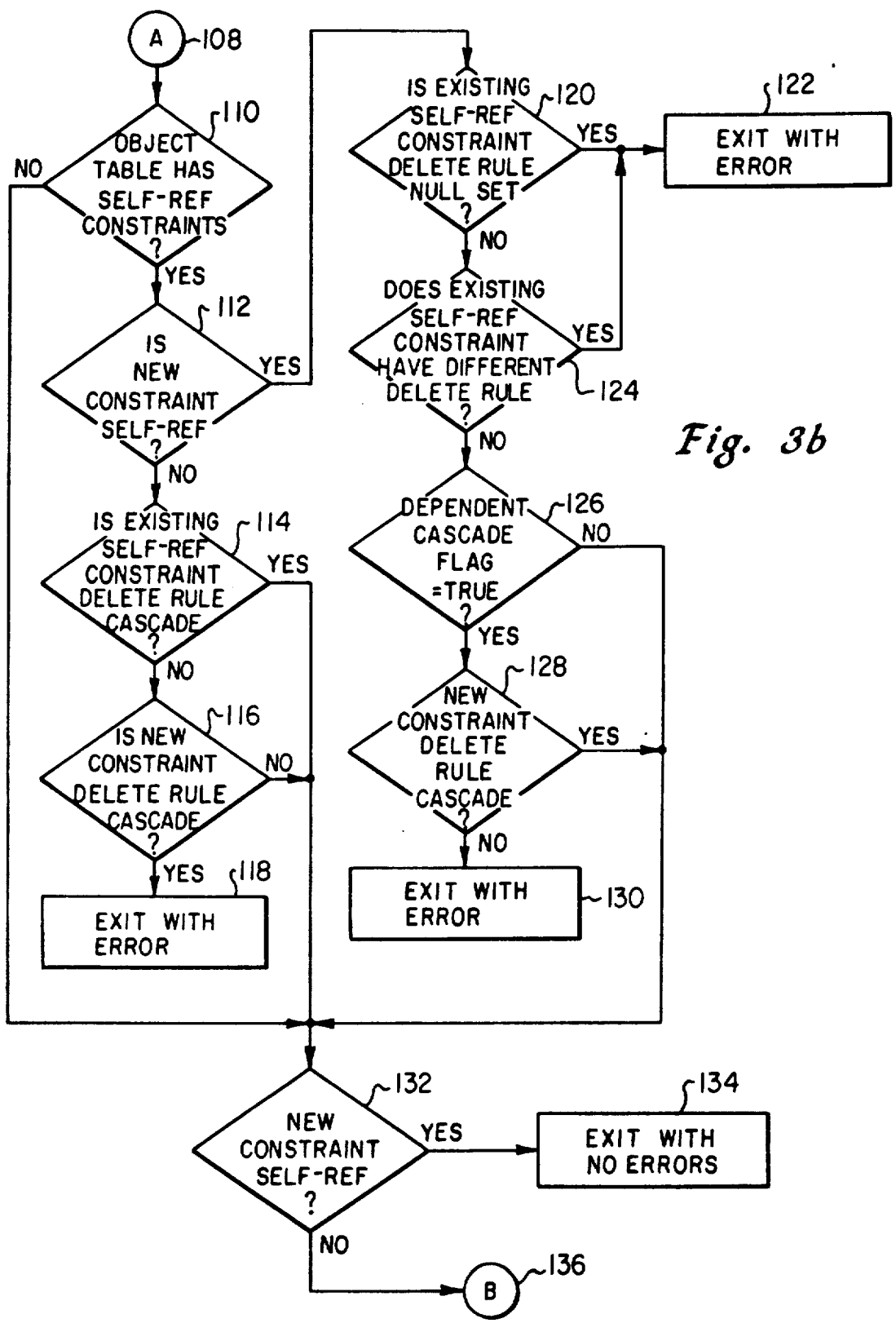
Figure 3C:
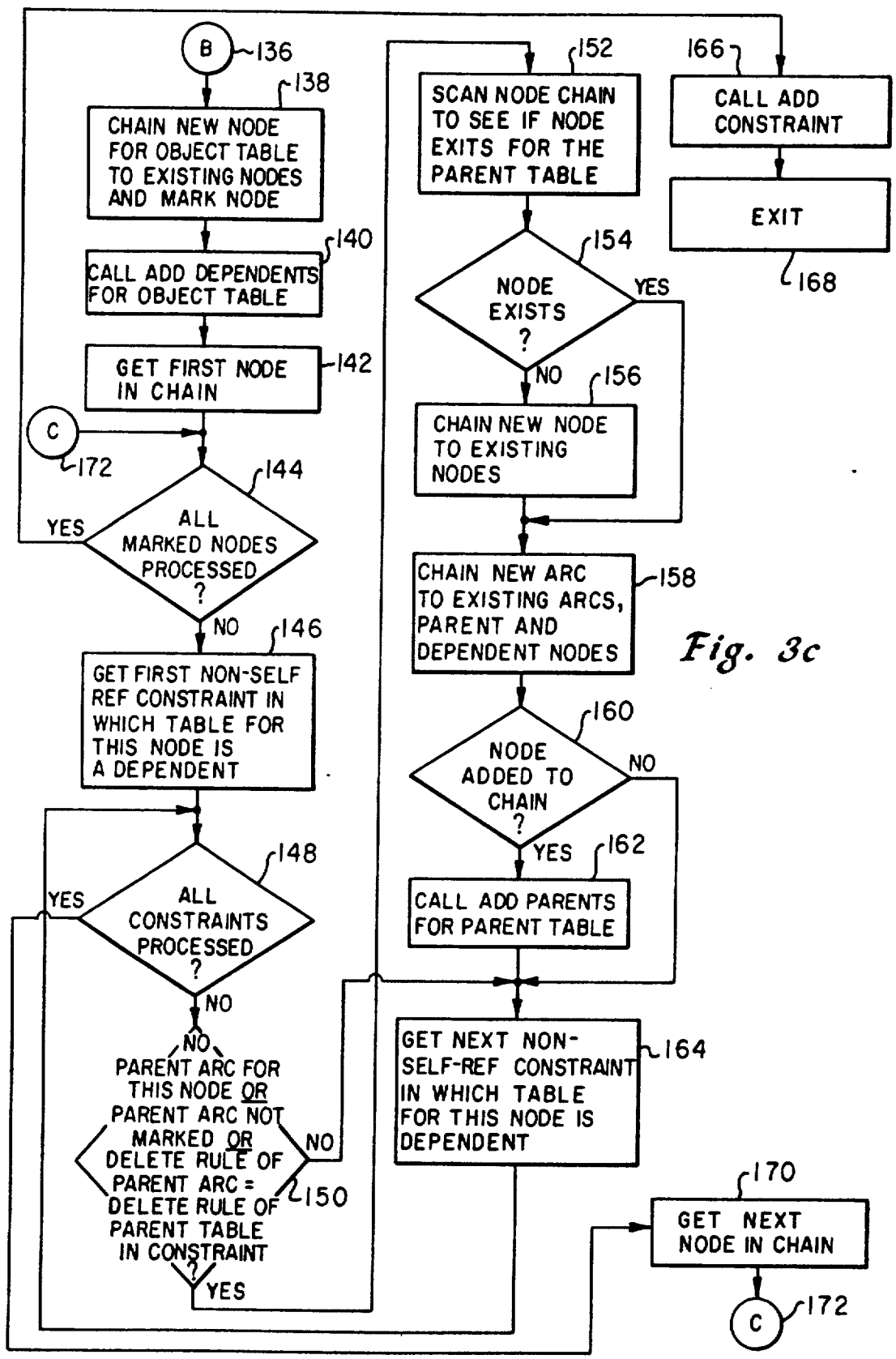

With reference now to FIGS. 3A, 3B, and 3C, which when considered in conjunction depict a logic flow chart which illustrates the method of the present invention which may be utilized to verify referential integrity may be maintained after the addition of a proposed new referential constraint. This process begins at block 72. The method disclosed herein first examines all relationships for the object table, which is the data table being created or altered in the description of this method, to determine whether or not any known non-error conditions exist.

This process begins in block 74 where the dependent restrict flag is initiated to indicate if the proposed referential constraint delete rule is Restrict. Next, block 76 illustrates the setting of the dependent Cascade flag equal to false. Thereafter, block 78 is utilized to illustrate the obtaining of the first constraint in which the object table is a dependent. Block 80 is next utilized to determine whether or not all constraints have been processed and if not, block 82 illustrates a determination of whether or not the delete rule for the constraint under consideration in which the object table is a dependent is Restrict. If not, block 84 depicts the setting of the dependent Restrict rule flag equal to false.

Next, block 86 illustrates the determination of whether or not the delete rule in the constraint being examined is Cascade and if so, block 88 depicts the setting of the dependent Cascade flag equal to true. Thereafter, block 90 depicts the obtaining of the next constraint in which the object table is a dependent and the process returns to block 80.

In the event that a determination was made in block 82 that the delete rule in the constraint under consideration was Restrict, or in block 86 that the delete rule was not Cascade, then the process also passes to block 90 to obtain the next constraint for consideration. After examining all constraints in which the object table is a dependent, as determined by block 80, the process then passes to block 92 to examine those relationships in which the object table is a parent.

Block 92 illustrates the initialization of the parent Cascade flag to false and thereafter, block 94 depicts the obtaining of the first constraint in which the object table is a parent. Next, block 96 is utilized to illustrate the determination of whether or not all constraints in which the object table is a parent have been processed. If not, block 98 illustrates a determination of whether or not the delete rule for the constraint under consideration is Cascade. If the delete rule for the constraint under consideration is Cascade then block 100 illustrates the setting of the parent Cascade flag to true and the process passes to block 102. Block 102 illustrates the obtaining of the next constraint for consideration in which the object table is a parent. Similarly, if the determination illustrated in block 98 shows that the delete rule is not Cascade then the process also passes to block 102 to obtain the next constraint for consideration. Thereafter, the process returns to block 96 to determine whether or not all constraints in which the object table is a parent have been processed.

Next, the process passes to block 104 which illustrates a determination of whether or not the dependent Restrict flag is false or the parent Cascade flag is true. If neither of these conditions exist, then the process exits and indicates no error, as illustrated in block 106. The portion of the logic flow chart described above is utilized to examine all relationships of the object table to determine whether or not the delete rule is Restrict for all relationships for the which the object table is a dependent and not Cascade for all relationships for which the object table is a parent. Under this condition the proposed new constraint can have no adverse effect on referential integrity and the examination need not continue.

In the next portion of the method, the process passes through block 108 into a new section which is utilized to examine any self-referencing constraints which may exist in the database under consideration. Block 110 is utilized to determine whether or not the object table has any self-referencing constraints, including the newly proposed constraint, contained therein. If so, block 112 depicts a determination of whether or not the newly proposed constraint is self-referencing. Thereafter, block 114 illustrates a determination of whether the existing self-referencing constraint utilizes a Cascade delete rule and if the existing self-referencing constraint does not utilize a Cascade delete rule. Block 116 then illustrates a determination of whether or not the newly proposed constraint is a Cascade delete rule. If so, the process exists with an error indication at block 118.

In the event the existing self-referencing constraint utilizes a Cascade delete rule constraint or the newly proposed constraint does not utilize a Cascade delete rule, then the process passes to block 132. Referring again to block 112, if the newly proposed constraint is a self-referencing constraint, the process passes to block 120. Block 120 is utilized to illustrate a determination of whether or not the existing self-referencing constraint utilizes a Null Set delete rule. If so, the process exits with an error message, as depicted in block 122. If the existing self-referencing constraint does not utilize a Null Set delete rule, then block 124 illustrates a determination of whether or not the existing self-referencing constraint has a different delete rule from the newly proposed self-referencing constraint. If the delete rules are different the process again passes to block 122 which illustrates the exiting of the process with an error message.

In the event the existing self-referencing constraint and the proposed self-referencing constraint have identical delete rules the process passes to block 126. Block 126 illustrates a determination of whether or not an existing non-self-referencing constraint utilizes a Cascade delete rule by determining if the dependent Cascade flag is true. If so, block 128 depicts a determination of whether or not the new constraint utilizes a Cascade delete rule. If not, the process once again exits with an error message, as depicted in block 130.

In the event the existing non-self-referencing constraint does not utilize a Cascade delete rule, as determined in block 126, or the newly proposed constraint utilizes a Cascade delete rule then the process passes to block 132. Block 132 illustrates a determination of whether or not the newly proposed constraint is self-referencing. If so, block 134 depicts the exiting of the process with no error indicated. The foregoing section of the logic flow chart has been utilized to determine if there is more than one self-referencing constraint and their delete rules are not the same, or the delete rules are Set Null, then an error condition must exist. Similarly, if there is any other constraint with a delete rule of Cascade and all self-referencing constraints do not utilize a Cascade delete rule, an error must occur. At this point, if the object relationship is a self-referencing constraint no error will occur and the process need not proceed further. It should be noted at this point that hereafter only non-self-referencing constraints will be considered in the illustrated logic flow chart.

At this point, the process passes through block 136 into the portion of the logic flow chart illustrated which illustrates the creation of a model of a selected portion of the database under consideration which may be examined to determine whether or not referential integrity may be maintained in view of a proposed creation or alteration of a data table therein. The aforementioned model may be visualized as a graph in which nodes represent data tables and arcs represent the relationships between data tables. This process begins at block 138 which illustrates the chaining of a new node for the object table to existing nodes and the marking of that node. Next, block 140 depicts the calling of the Add Dependents procedure which is illustrated in FIG. 4.

Figure 4:
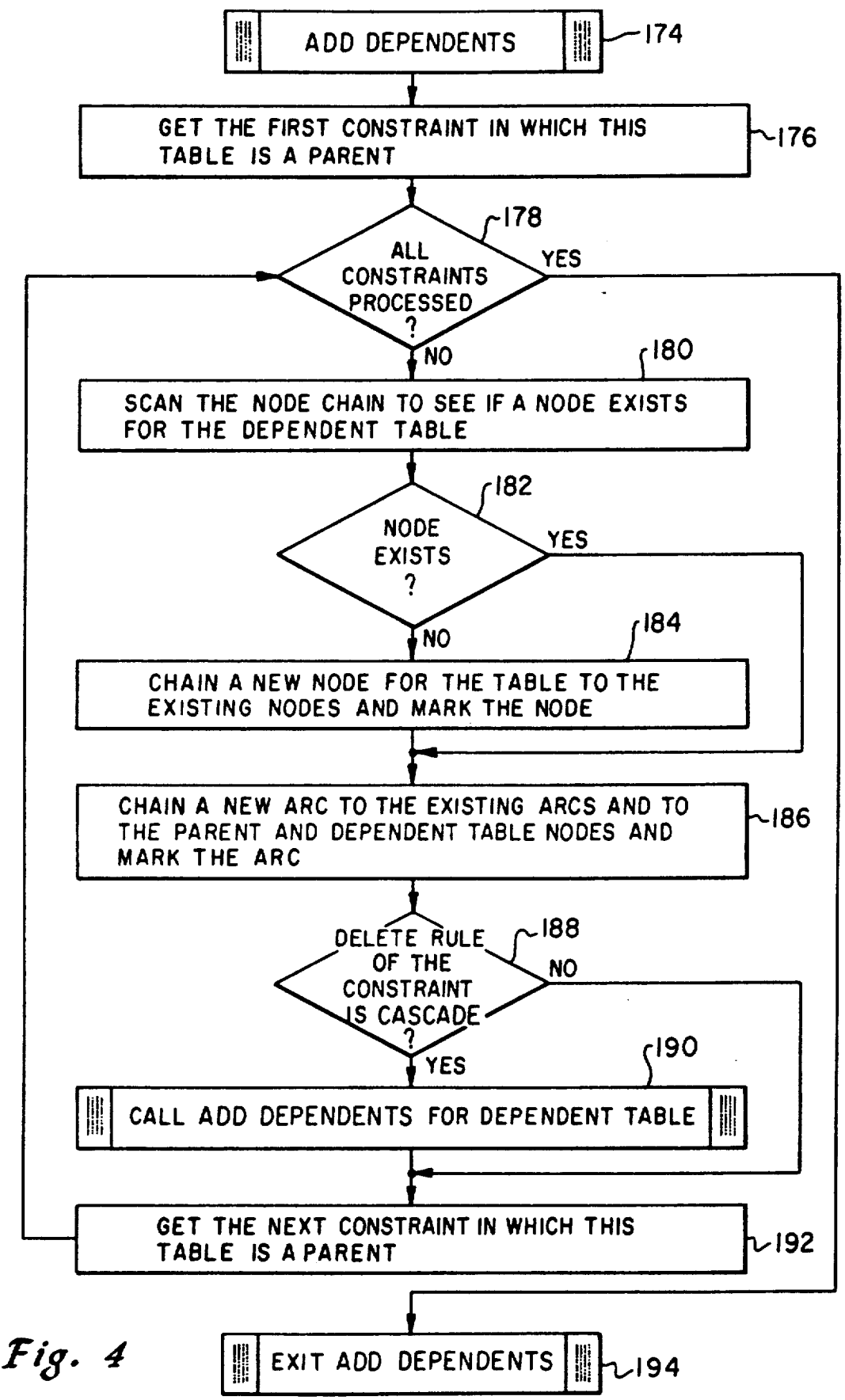
FIG. 4 depicts a logic flow chart illustrating the manner in which selected dependent tables are added to a database model.

Referring now to FIG. 4, the Add Dependents procedure is illustrated and begins at block 174. Thereafter, block 176 illustrates the obtaining of the first constraint in which the table under consideration is a parent. Next, block 178 illustrates a determination of whether or not all constraints have been processed. If so, the Add Dependents procedure terminates as illustrated in block 194.

In the event that all constraints have not been processed, as determined by block 178, block 180 next illustrates the scanning of the node chain to see if a node exists for the dependent table. Thereafter, block 182 illustrates a determination of whether or not such a node exists. If not, block 184 illustrates the chaining of a new node for a table which is a dependent of the table to the existing nodes and the marking of that node. In the event the determination illustrated in block 182 finds that a node already exists or, after chaining the new node for the table to the existing nodes, as illustrated in block 184, the procedure passes to block 186. Block 186 illustrates the chaining of a new arc to the existing arcs and to the parent and dependent table nodes. Thereafter, the arc is marked or flagged in a manner which will assist in the verification that referential integrity may be maintained after the modeling procedure is completed. By arc what is meant is the portion of the database model which illustrates the relationship between two data tables within the database.

Next, block 188 illustrates a determination of whether or not the constraint just added utilizes a Cascade delete rule. If so, the Add Dependents procedure which begins in block 174 is called recursively as depicted in block 190, to add the next descendant table in the Cascade delete relationship. In this manner, the dependents of the object node are added to the model of the database which is being constructed as well as any dependent table which is linked to a dependent via a Cascade delete rule. Those skilled in the art will appreciate that it is only necessary to follow Cascade delete rules downward to dependent tables since delete-connection is not possible otherwise. In the event the delete rule of the constraint under consideration is not Cascade, or after adding all dependent tables which do have a delete rule of Cascade, the process proceeds to block 192. Block 192 illustrates the obtaining of the next constraint for which the table under consideration is a parent. After all constraints have been processed, as illustrated by the determination depicted in block 178, the procedure passes to block 194 and exits the Add Dependents procedure.

Referring again to FIGS. 3A, 3B, and 3C, block 142 next illustrates the obtaining of the first node in the chain of nodes which has been created by the modeling process thus far described. Next, block 144 illustrates a determination of whether or not all marked nodes have been processed. If not, the process passes to block 146. Block 146 illustrates the obtaining of the first non-self-referencing constraint in which the table for the node being processed is a dependent.

Next, block 148 illustrates a determination of whether or not all constraints have been processed. If not, block 150 is utilized to illustrate a determination of whether or not a parent arc exists for this node, or the parent arc is not marked, or the delete rule of the parent arc is not equal to the delete rule of the parent table in the constraint. If none of these conditions are met then the process passes to block 164. Block 164 illustrates the obtaining of the next non-self-referencing constraint in which the table under consideration for this node is a dependent. Thereafter, the process returns to block 148 to determine whether or not all constraints have been processed.

In the event any one of the conditions stated within block 150 is met the process passes to block 152. Block 152 illustrates the scanning of the node chain to see if a node exists for the parent table. Block 154 then depicts a determination of whether or not that node exists. If not, block 156 illustrates the chaining of a new node to the existing nodes and the process passes to block 158. In the event the node for the parent table does exist, as determined in block 154, then the process also passes to block 158 from block 154.

Next, block 158 illustrates the chaining of the new arc to the existing arcs for the parent and dependent nodes. Block 160 then depicts a determination of whether or not a node has been added to the chain. If a node has been added, the process proceeds to block 162. Block 162 illustrates the calling of the Add Parents procedure for the parent table which is illustrated within FIG. 5.

Figure 5:
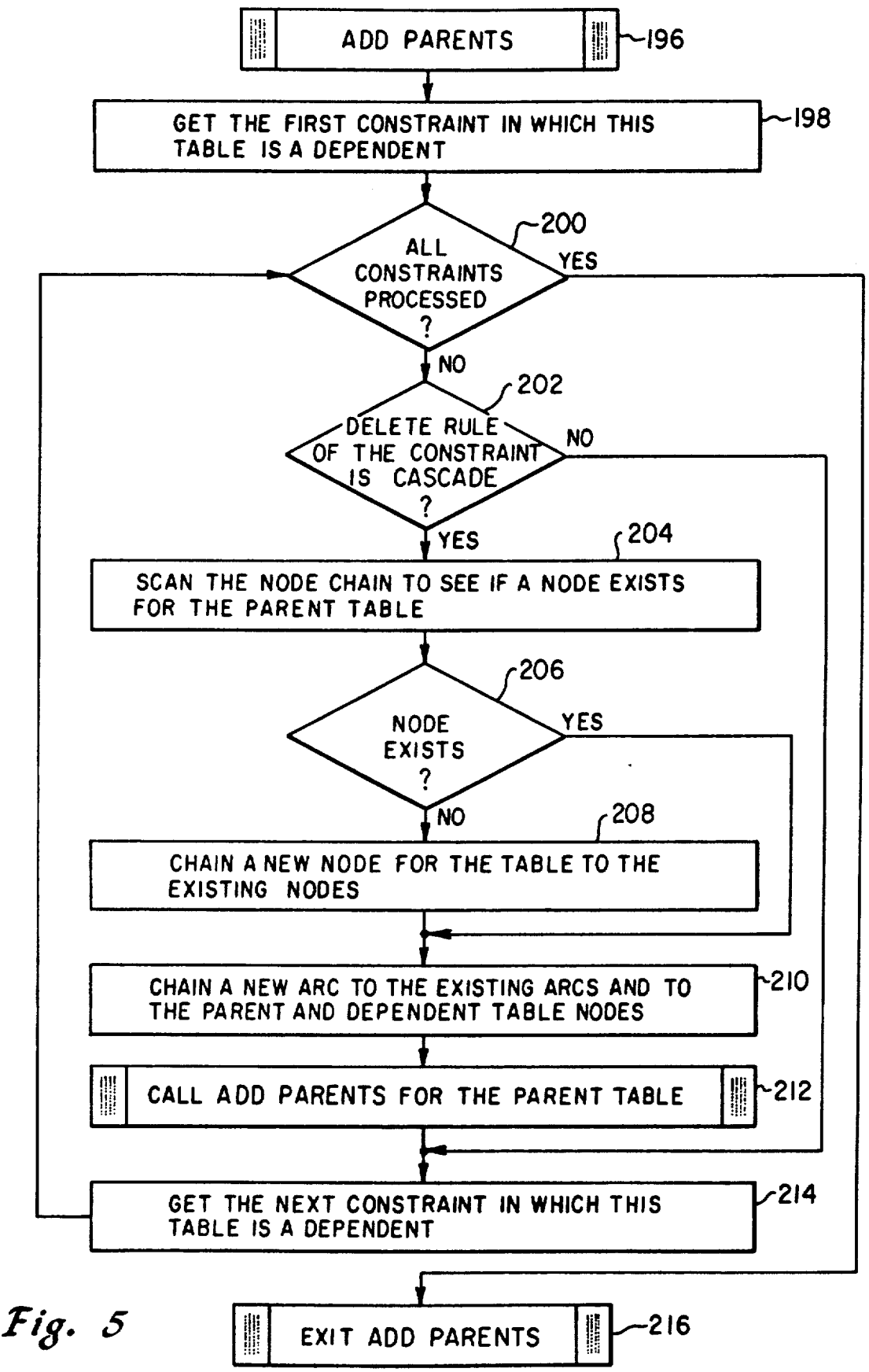
FIG. 5 depicts a logic flow chart illustrating the manner in which selected parent tables are added to a database model.

Referring now to FIG. 5, the Add Parents procedure is illustrated and begins as depicted in block 196. Thereafter, block 198 illustrates the obtaining of the first constraint in which the table under consideration is a dependent. Next, a determination is illustrated in block 200 of whether or not all constraints have been processed. If not, block 202 illustrates a determination of whether or not the delete rule for the constraint under consideration is Cascade.

If the delete rule for the constraint under consideration is Cascade, then block 204 illustrates the scanning of the node chain to see if a node exists for the parent table located by this process. Block 206 then depicts the determination of whether or not that node exists. If the node does not exist, block 208 depicts the chaining of a new node for this table to the existing nodes. In the event that the node already exists, then the process passes to block 210 which illustrates the chaining of a new arc to the existing arcs and to the parent and dependent table nodes. The Add Parents procedure which begins at block 196 is then called recursively, as depicted in block 212 to add any additional ancestor tables which may exist.

In the event the delete rule of the constraint under consideration is not Cascade, as determined in block 202, or after all parent tables have been added to the model, the process passes to block 214. Block 214 illustrates the obtaining of the next constraint in which this table is a dependent. Thereafter, the process returns to block 200 to determine whether or not all constraints have been processed. After all such constraints have been processed, the Add Parents procedure exits, as illustrated in block 216.

Figure 6A:
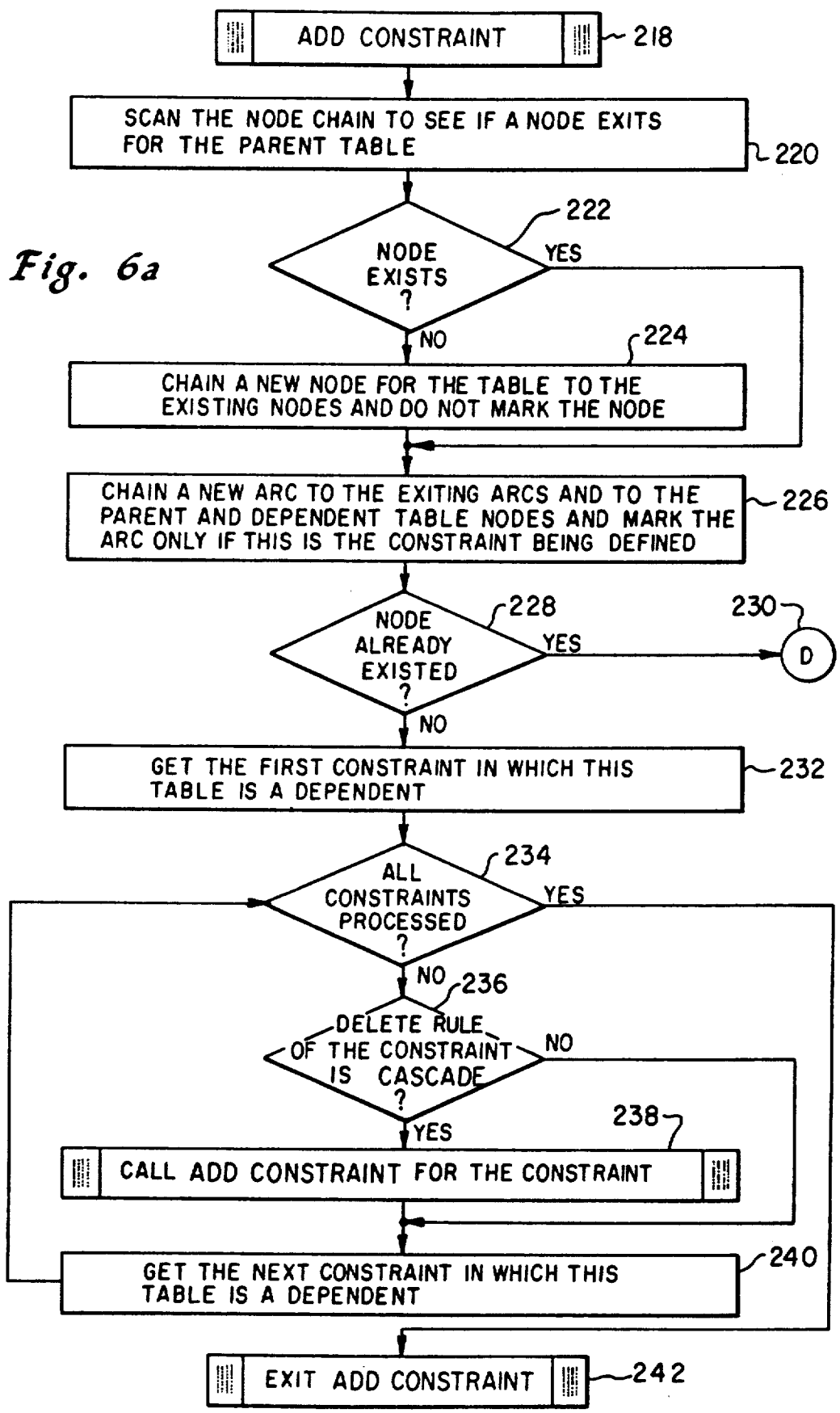
FIGS. 6A and 6B depicts a logic flow chart illustrating the manner in which selected additional constraints are added to a database model.
Figure 6B:
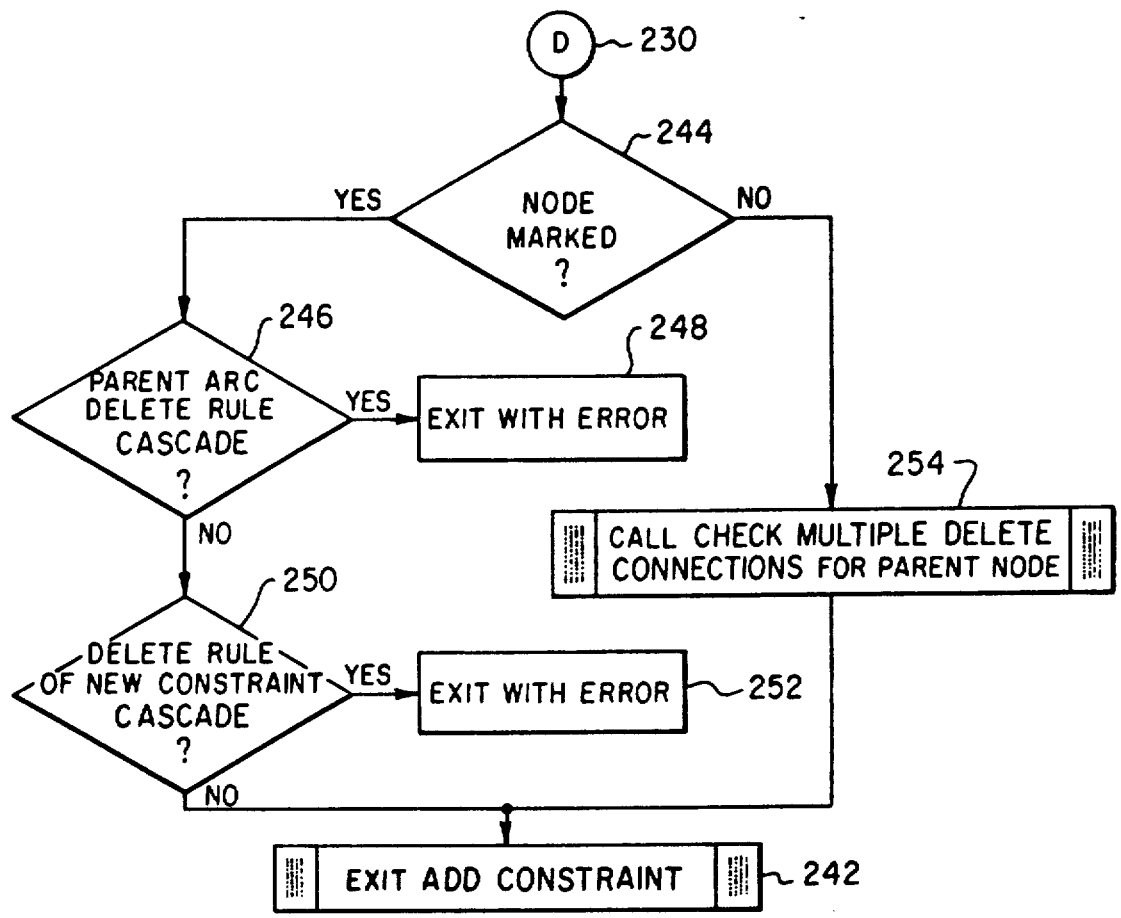

Referring once again to the logic flow chart illustrated in FIG. 3A, 3B, 3C, after all necessary parent tables have been added to the model by utilizing the Add Parents procedure illustrated in FIG. 5, the process returns to block 164. Block 164 illustrates the obtaining of the next non-self-referencing constraint in which the table under consideration is a dependent. Referring again to block 148, after all constraints have been processed the procedure passes to block 170. Block 170 illustrates the obtaining of the next node in the chain. Thereafter, the process passes through block 172 and returns to block 144 for a determination of whether or not all marked nodes have been processed. If all marked nodes have been processed the procedure passes to block 166. Block 166 illustrates the calling of the Add Constraint procedure which is illustrated in FIGS. 6A and 6B. Thereafter, the process terminates, as illustrated in block 168.

With reference now to FIGS. 6A and 6B, the Add Constraint procedure is illustrated and begins as depicted in block 218. Thereafter, block 220 illustrates the scanning of the node chain to see if a node exists for the parent table. A determination of whether or not that node exists is illustrated in block 222. If the node does not exist, block 224 illustrates the chaining of a new node for that table to the existing nodes. It should be noted that this node will not be marked. If a node already exists, as determined by block 222, or after chaining a new node to the existing nodes, as illustrated in block 224, the process passes to block 226. Block 226 depicts the chaining of a new arc to the existing arcs and to the parent and dependent table nodes. This arc is marked only if the arc represents the constraint which is being defined.

Next, block 228 illustrates a determination of whether or not the node already existed. If not, block 232 illustrates the obtaining of the first constraint in which this table is a dependent. Next, block 234 illustrates the determination of whether or not all constraints have been processed and if so, the Add Constraint procedure terminates, as illustrated in block 242.

In the event all constraints have not been processed, as determined by block 234, then block 236 illustrates a determination of whether or not the delete rule for the constraint under consideration is Cascade. If so, the Add Constraint procedure which began at block 218 is called recursively, as depicted in block 238. In the event the delete rule of the constraint under consideration is not Cascade, as determined in block 236, then block 240 next illustrates the obtaining of the next constraint in which the table under consideration is a dependent.

Referring again to block 228, if the node under consideration already exists, the process passes through block 230 and continues with the determination which is depicted in block 244. Block 244 illustrates a determination of whether or not the node which already exists is a marked node. If so, block 246 depicts a determination of whether or not the parent arc utilizes a Cascade delete rule. If so, the process exits with an error message, as illustrated in block 248. If the parent arc delete rule is not Cascade, block 250 illustrates a determination of whether or not the delete rule for the new constraint is Cascade. If so, the process again exits with an error message, as illustrated in block 252.

Figure 7:
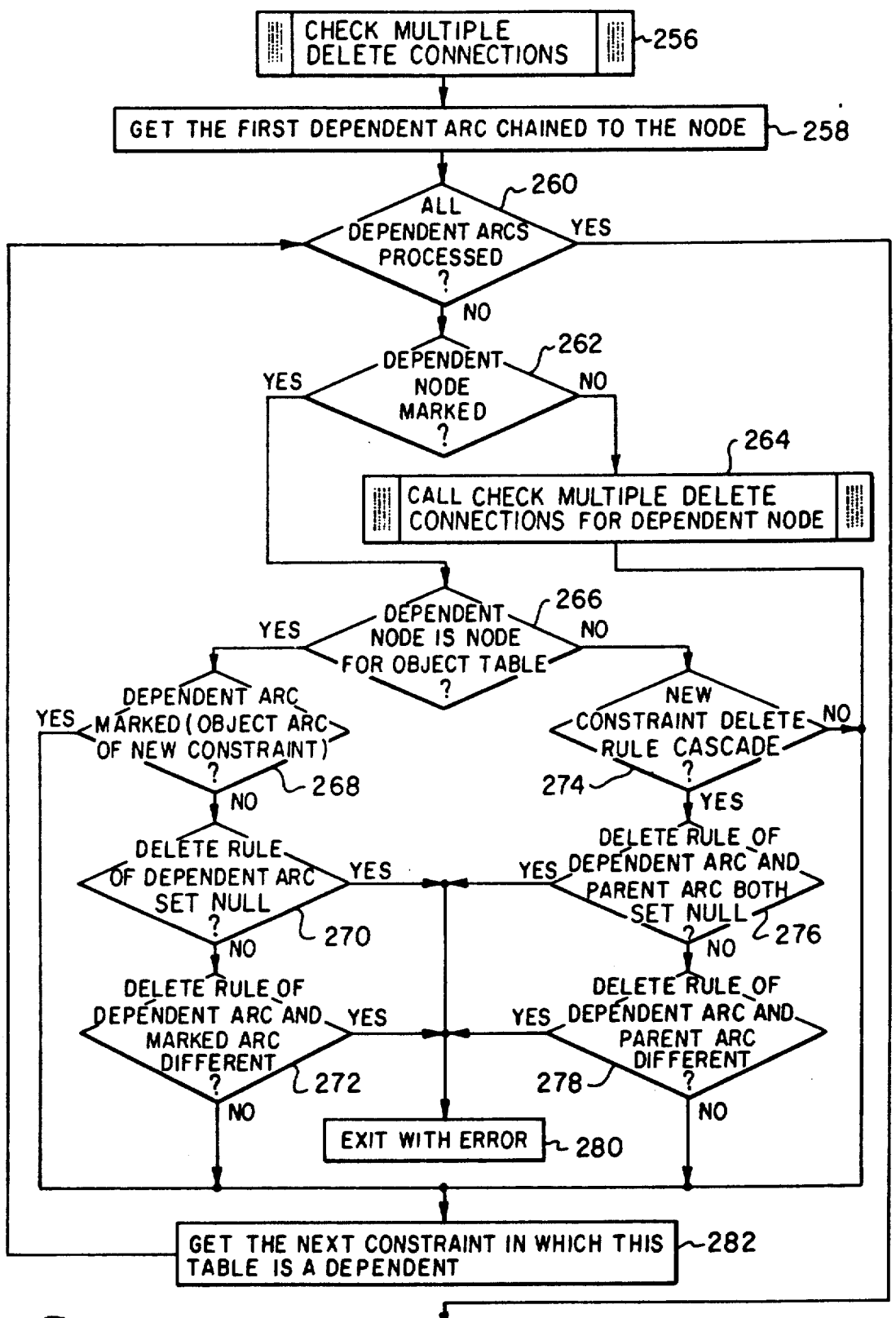
FIG. 7 depicts a logic flow chart which illustrates the manner in which multiple delete connections within the abbreviated database model may be examined to verify referential integrity may be maintained in the relational database.

Referring again to block 244, if the node which already exists is not marked, block 254 illustrates the calling of the Check Multiple Delete Connections procedure which is illustrated in FIG. 7. Thereafter, in either event, the Add Constraint procedure terminates as illustrated in block 242.

With reference now to FIG. 7, there is illustrated the Check Multiple Delete Connections procedure referred to above in the description of FIG. 6B. This process begins at block 256 and thereafter block 258 illustrates the obtaining of the first dependent arc which is chained to the node under consideration. Next, block 260 illustrates a determination of whether or not all dependent arcs have been processed. If all dependent arcs have been processed, the procedure terminates, as illustrated in block 284.

In the event all dependent arcs have not been processed, block 262 illustrates a determination of whether or not the dependent node is marked. If the dependent node is not marked, block 264 illustrates the recursive calling of the Check Multiple Delete Connections procedure which began at block 256, for consideration of the next dependent arc. In the event the dependent node is marked, as determined by block 262, the procedure passes to block 266. Block 266 illustrates a determination of whether or not the dependent node is the node for the object table. If so, block 268 illustrates a determination of whether or not the dependent arc is marked. In the event the dependent arc is marked, the procedure passes to block 282 which depicts the obtaining of the next constraint in which the table under consideration is a dependent.

In the event the dependent arc is not marked then block 270 illustrates a determination of whether or not the delete rule for the dependent arc is Set Null. If the delete rule is Set Null, the process exits with an error message, as illustrated in block 280. If the delete rule for the the dependent arc is not Set Null, the procedure passes to block 272 for a determination of whether or not the delete rule of the dependent arc and the marked arc are different. If the delete rules are different, the procedure again exits with an error message, as illustrated in block 280. In the event the delete rule of the marked arc and the dependent arc are not different the procedure passes to block 282. Block 282 illustrates the obtaining of the next constraint in which this table is a dependent.

Referring again to block 266, if the determination illustrated therein reveals that the dependent node is not the node for the object table the procedure passes to block 274 for a determination of whether or not the new constraint utilizes a Cascade delete rule. If the new constraint does not utilize a Cascade delete rule, the procedure passes to block 282. Block 282 illustrates the obtaining of the next constraint in which this table is a dependent.

In the event the new constraint utilizes a Cascade delete rule, block 276 illustrates a determination of whether or not the delete rule for the dependent arc and the parent arc are both Set Null. If so, the procedure exits with an error message, as illustrated in block 280. If the delete rule of the dependent arc and the parent arc are not both Set Null, the procedure passes to block 278 for a determination of whether or not the delete rule of the dependent arc and the parent arc are different. If the delete rules are different then the procedure exits with an error message, as illustrated in block 280. In the event the delete rules for the dependent arc and the parent arc are the same, the procedure returns to block 282 which illustrates the obtaining of the next constraint in which this table is a dependent.

Upon reference to the foregoing specification those skilled in the art will appreciate that the method disclosed by the Applicants herein provides a manner in which a proposed alteration to a relational database may be verified to determine if referential integrity may be maintained by first examining the relationships for the table which is to be created or altered for known non-error conditions or self-referencing constraints which will result in an error condition. Thereafter, the method described herein creates a model of a portion of the relational database by first beginning with the object table and thereafter adding all tables which are delete connected to the object table. Next, the procedure adds any parent tables which are not previously added to the model and any ancestor tables which are coupled to those parent tables by a Cascade delete rule.

It should be noted that each node or arc within the model is marked while considering dependent tables and not marked when following Cascade arcs upward through parent and ancestor tables. The significance of the marking of a node or an arc should be apparent to those skilled in the art upon reference to the foregoing specification. Whenever a restriction violation occurs due to a table being delete connected to itself in a cycle of two or more tables, a marked node is always involved. Further, if a table is delete connected to another table through multiple paths and the applicable relationships in which the table is a dependent do not have the same delete rule, the table which is delete connected will always be a marked node and a marked arc is always involved. After creating a model of that portion of the database which may be effected by the proposed new referential constraint, the method of the present invention then examines only those tables to determine whether or not the proposed alteration is valid with regard to the maintenance of referential integrity.

While the invention has been particularly shown and described with reference to a preferred embodiment, it will be understood by those skilled in the art that various changes in form and detail may be made therein without departing from the spirit and scope of the invention.

We claim:

1. A method in a data processing system for determining the validity of a new referential constraint brought about by the creation or alteration of a selected data table within a relational database having a plurality of related data tables, said method comprising the steps of:
   identifying which of said plurality of related data tables will be affected by the existence of said new referential constraint by creating a model of a selected portion of said relational database, said model including said selected data table; all data tables dependent from said selected data table; all data tables descendant from said dependent data tables which are delete-connected to said selected table; all data tables which are the parent table for any data table previously include with said model; and any ancestor data table having a Cascade relationship with any table previously included within said model; and
   verifying the validity of said new referential constraint only upon said identified related data tables within said model.

2. A method in a data processing system for determining the validity of a new alteration of a selected data table within a relational database having a plurality of related data tables, said method comprising the steps of:
   examining all of the relationships for said selected data table to determine if any of said plurality of elated data tables will be affected by the existence of said new referential constraint by creating a model of a selected portion of said relational database, said model including said selected data table; all data tables dependent from said selected data table; all data tables descendant from said dependent data tables which are delete-connected to said selected table; all data tables which are the parent table for any data table previously included with said model; and any ancestor data table having a Cascade relationship with any table previously included within said model;
   in the event any of said plurality of related data tables will be affected, identifying which of said plurality of related data tables within said model will be affected by the existence of said new referential constrain; and
   verifying the validity of said new referential constrain only upon said identified related data tables within said model.

3. An apparatus for determining the validity of a new referential constraint brought about by the creation or alteration of a selected data table within a relational database in a data processing system having a plurality of related data tables, said apparatus comprising:
   means for identifying which of said plurality of related data tables will be affected by the existence of said new referential constraint by creating a model of a selected portion of said relational database, said model including said selected data table; all data tables dependent form said selected data table; all data tables descendant from said dependent data tables which are delete-connected to said selected table; all data tables which are the parent table for any data table previously included with said model; and any ancestor data table having a Cascade relationship with any table previously included within said model; and
   means for verifying the validity of said new referential constraint only upon said identified related data tables within said model.

* * * * *